United States Patent
Spivey et al.

(10) Patent No.: US 6,191,878 B1
(45) Date of Patent: Feb. 20, 2001

(54) OPTICAL COMMUNICATION SYSTEM

(76) Inventors: Brett Spivey, 131 Seeman Dr., Encinitas, CA (US) 92024; James Menders, 943 Oliver Ave., San Diego, CA (US) 92109

(*) Notice: Under 35 U.S.C. 154(b), the term of this patent shall be extended for 0 days.

(21) Appl. No.: 08/921,812

(22) Filed: Sep. 2, 1997

Related U.S. Application Data (63) Continuation-in-part of application No. 08/221,527, filed on Apr. 1, 1994, now Pat. No. 5,754,323, and a continuation-in-part of application No. 08/667,400, filed on Jun. 21, 1996, now Pat. No. 5,801,866.

(51) Int. Cl.[7] .................................................. H04B 10/06
(52) U.S. Cl. ............................................. 359/189; 359/179
(58) Field of Search ................................ 359/189, 190, 359/191, 193, 194, 195, 179

(56) References Cited

U.S. PATENT DOCUMENTS

| | | | |
|---|---|---|---|
| 4,947,134 | * 8/1990 | Olsson | 359/173 |
| 5,390,202 | * 2/1995 | Yan et al. | 372/26 |
| 5,537,634 | * 7/1996 | Fye | 359/124 |
| 5,731,585 | * 3/1998 | Mender et al. | 250/382 |

* cited by examiner

*Primary Examiner*—Rafael Bacares
(74) *Attorney, Agent, or Firm*—Fish & Richardson (57) ABSTRACT

A high speed optical receiver for receiving a substantially diminished optical signal. An optical amplifier amplifies the diminished optical signal at least several db and an ultra narrow-band filter filters the noise generated in the optical amplifier to produce a filtered amplified optical signal which is detected by a fast response photo detector. In a preferred embodiment the optical amplifier is a semiconductor laser amplifier. In this embodiment a Faraday filter provides the ultra narrow-band filtering, virtually eliminating the noise produced by the amplifier. Transmitters are described for transmitting information at a wavelength tuned to the ultra narrow-band filters.

13 Claims, 7 Drawing Sheets

**INCREASING CURRENT
INCREASING WAVELENGTH**

OPTICAL COMMUNICATION SYSTEM

This is a Continuation-In Part of Ser. No. 08/221,527, now U.S. Pat. No. 5,754,323 Point to Point Laser Communication Device, filed Apr. 1, 1994 and Ser. No. 08/667,400, now U.S. Pat. No. 5,801,866 Laser Communication Device, filed Jun. 21, 1996.

BACKGROUND OF THE INVENTION

This invention relates to communication devices and in particular to optical communication devices.

Optical communications system receivers need high sensitivity and fast response. One approach to selecting an optical receiver for a communications system is to first identify receivers of sufficient sensitivity, and then to pick the receiver with the fastest response among them. Such a procedure has led the free space communications industry to select silicon avalanche photodiodes (APDs) for long distance, free space laser communications system operating at a wavelength of about 0.8 mm. However, the response time of ADPs is generally limits them to signals at a GHz. The speed of the APDs is limited by a time constant associated with the electron multiplication process. Much faster speeds are achievable using p-i-n photodiodes. However, the p-i-n photo diode sensitivity is not sufficient for many applications. It is known that the sensitivity of a p-i-n photo diode-based photo receiver can be increased by adding an optical preamplifier ahead of the photo diode to first amplify the optical signal prior to photo detection. The use of optical preamplifiers for laser receivers in fiber optics communications systems is known. The preamplifiers themselves typically consist of semiconductor lasers with reduced facet reflectivities, operated just below the lasing threshold. These semiconductor laser amplifiers do a good job of amplifying the signal, producing amplifications on of up to 25 to 30 db. However, the amplifiers are very noisy. Interference filters have been proposed to cut down on the amplifier noise with only limited success.

It is known that atomic line filters can be used to obtain ultra narrow band optical filtering. Faraday filters are also know and have been used to provide ultra narrow-band optical filtering. See Menders et al, "Ultra narrow line filtering using a Cs Faraday filter at 852 nm" (OPTICS LETTERS, Vol. 16, No. 11, Jun. 1, 1991).

What is needed is an optical communication system having transmitting and receiving components in which a signal beam which can be allowed to diminish to extremely low levels and still be detected by the optical receiving components in the system.

SUMMARY OF THE INVENTION

The present invention provides a high speed optical receiver for receiving a substantially diminished optical signal. An optical amplifier amplifies the diminished optical signal at least several db and an ultra narrow-band filter filters the noise generated in the optical amplifier to produce a filtered amplified optical signal which is detected by a fast response photo detector. In a preferred embodiment the optical amplifier is a semiconductor laser amplifier. In this embodiment a Faraday filter provides the ultra narrow-band filtering, virtually eliminating the noise produced by the amplifier. Transmitters are described for transmitting information at a wavelength tuned to the ultra narrow-band filters.

DETAILED DESCRIPTION OF PREFERRED EMBODIMENTS

Atomic Line Filter vs. Conventional Filter

Conventional optical filters are relatively wide band filters as compared to atomic line filters; however, they can be simple, cheap and generally present no operational problems. A comparison of some of the principal features of these two types of filters is made in the following table:

|  | Atomic Line Filters | Conventional Filters |
| --- | --- | --- |
| Bandwidth | 0.01 nm | 3.5 nm |
| Field of View | Wide up to 60 Degrees | Narrow, a Few Degrees |
| Insertion Loss | 60% | 30% |
| Size of Filter | Several cm Thick | 5 mm Thick Plate |
| Power | 5 W | Unpowered |
| Companion Laser | Precision, Narrow band Frequency Locked Laser Diode | High Peak Power Pulsed Laser |
| General Description | Costly, High Performance, Wide Field of View | Relatively Inexpensive, Moderate Performance Moderate Field of View |

Preferred Embodiments

Preferred embodiments of the present invention can be described by reference to the drawings.

Figure 1:
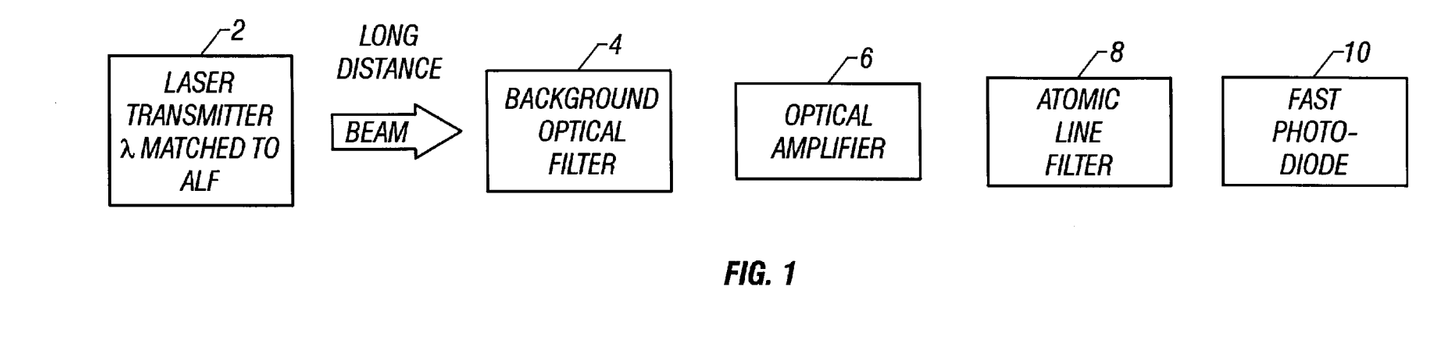
FIG. 1 is a block diagram of a first preferred embodiment of the present invention.
Figure 2:
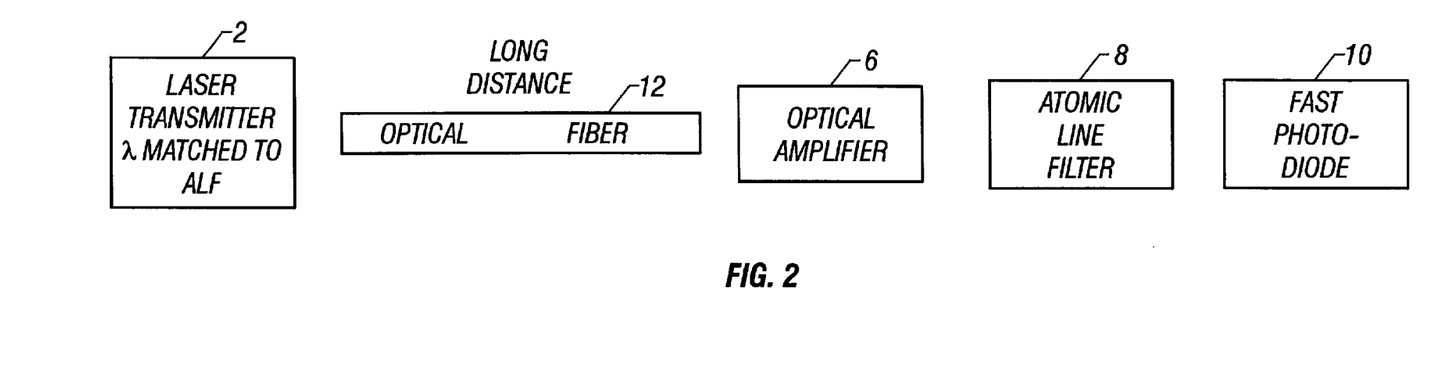
FIG. 2 is a block diagram of a second preferred embodiment of the present invention.
Figure 3:
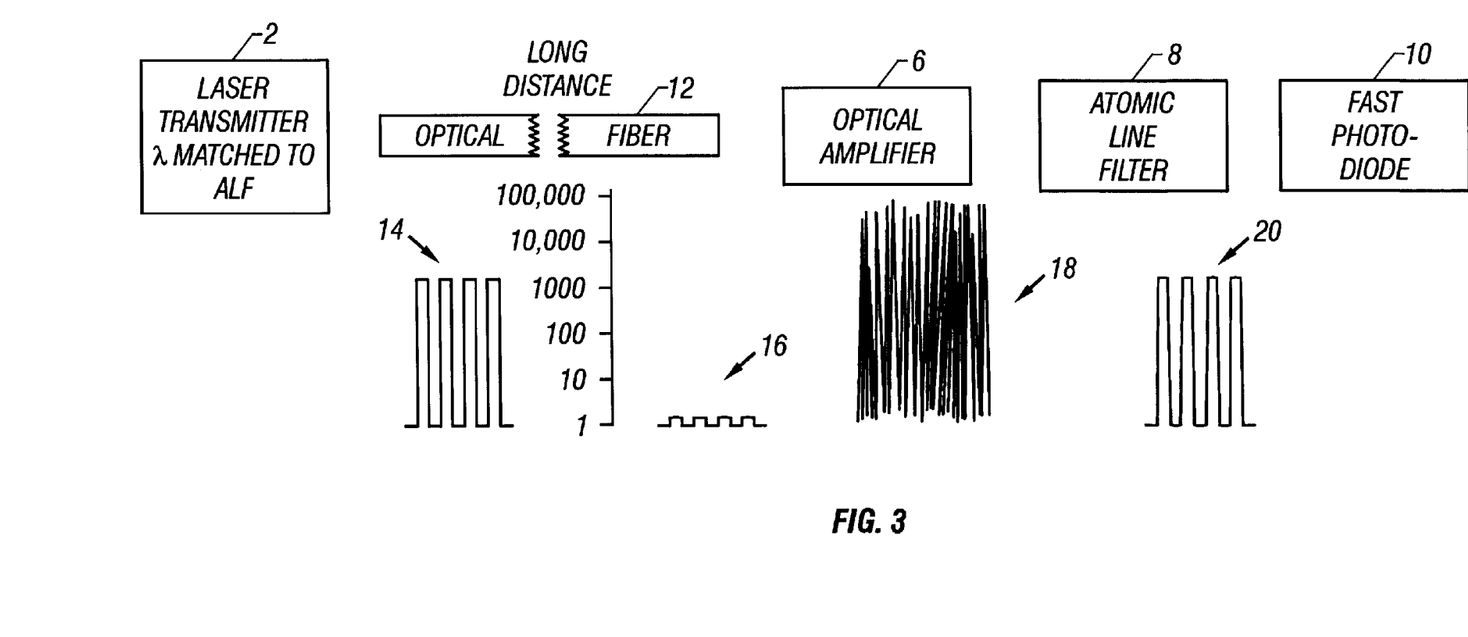
FIG. 3 is a drawing showing the general shape of signals at various locations in the above second preferred embodiment.

FIG. 1 is a block diagram of a first preferred embodiment of the present invention. Laser transmitter 2 transmits a free space laser beam which is matched in wavelength to the very narrow pass band of atomic line filter 8. The beam is substantially diminished in power when it reaches the receiver consisting of a background optical filter 4, an optical amplifier 6, the atomic line filter 8 and a fast photo diode 10. FIG. 2 is a second preferred embodiment. In this embodiment the beam travels in optical fiber 12 and no background optical filter is provided. FIG. 3 gives qualitative representations: (a) of the signal 14 as it enters the optical fiber 12 of FIG. 2, (b) of the diminished signal 16 at the receiver end of the optical fiber, (c) of the amplified signal 18 after it has been amplified by optical amplifier 6, and (d) of the filtered amplified signal 20 after it has been filtered by atomic line filter 8. The effect of the optical amplifier is to greatly amplify the signal, but it also produces a large amount of interfering broadband noise.

Transmitter

Figure 4:
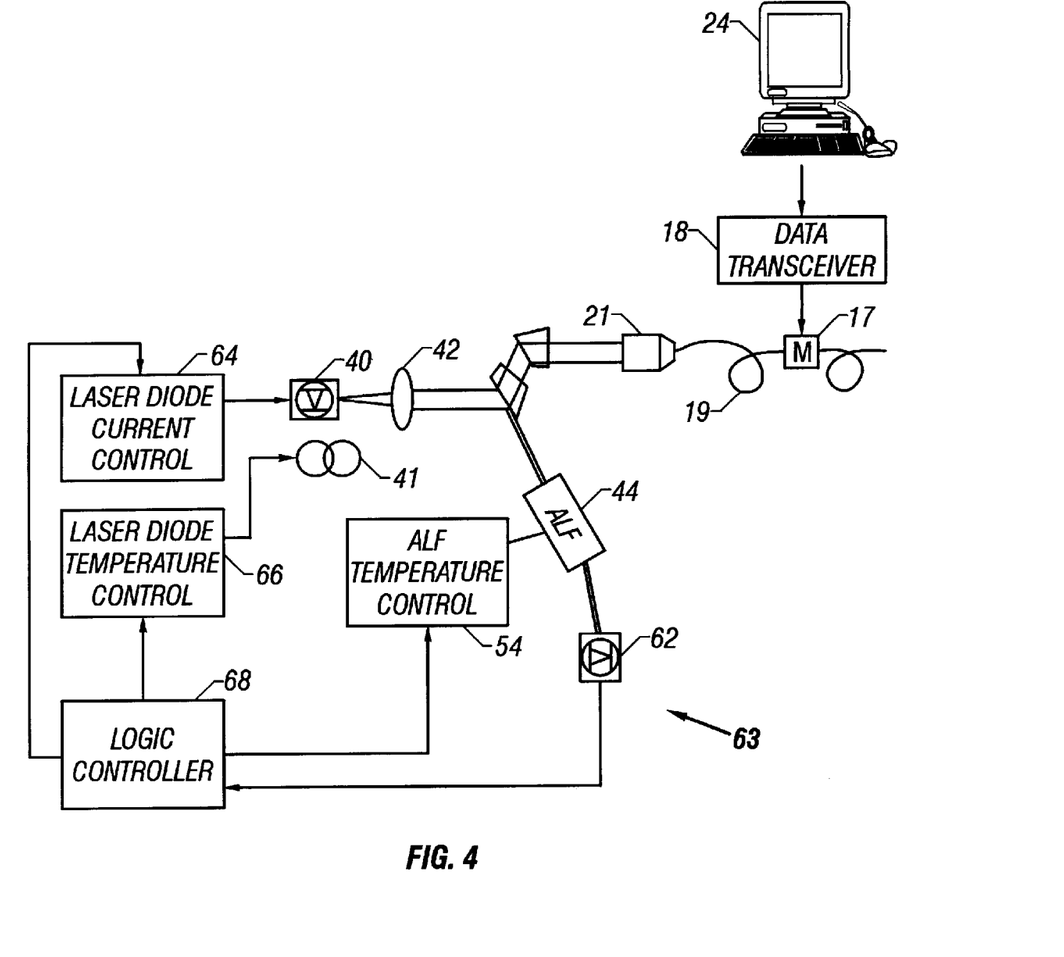
FIG. 4 is a block diagram showing the components laser transmitter referred to in FIG. 1.

A preferred transmitter is shown in FIG. 4. As stated above, the transmitter must transmit a signal beam having a spectrum matching the atomic line filter passband. A distributed Bragg reflector semiconductor laser designed to operate at a wavelength near 852 is a good match. Such lasers are commercially available. One preferred laser is a 150 mWatt diode laser 40 Model No. SL-5722-H1 supplied by SDL. This laser operates nominally at 852 nm wavelength. In this preferred embodiment, we lock the laser 40 at one of the precise wavelengths at or very near 852.11 nm, which corresponds to the $6s_{1/2}$–$6p_{3/2}$ transition in cesium. One way to do this, is to configure the laser system into a wavelength controlled unit as shown in FIG. 4. This control is achieved using temperature control and current control of the laser and an ALF. A feedback circuit 63 is provided to control the diode current and maintain the output at the selected precise wavelength.

The temperature of the diode is regulated by thermoelectric heat pumps 41. The heat pumps are driven by a Wavelength Electronics FPT 2000 thermoelectric cooler controller 66. The temperature of the laser diode is maintained to within ±0.05° C. of the required temperature for optimum wavelength stability. The laser diode is driven by a low noise, voltage controlled current source 64. The current source used to drive the cw laser diode is Wavelength Electronics FPL 250. The laser diode output is collimated with a Rodenstock 1403.108 lens 42. Direct modulation of the laser at multi-Gbaud rates can be accomplished using an optical waveguide modulator 17 such as the United Technologies Phonic Mach-Zehnder modulator. These modulators preserve polarization and are supplied with fiber pigtails 19 at the input and output. Light is coupled into the fiber using a microscopic objective 21. In this example the transmitted information is provided from computer 24 through data transceiver 18.

The microcontroller 68 is used to implement a digital frequency control loop. To set the laser frequency, the microcontroller will ramp the laser diode drive current up and down thereby ramping the laser frequency. The counters output is connected to a digital to analog converter whose output drives the input of the voltage controlled current source. Output monitor photo diode 62 samples a small portion of the beam form diode 40 which is directed through atomic line filter 44. The signal from diode 62 is digitized and sent to the micro controller 68. The micro controller will drive the laser diode current up or down searching for the peak output as sensed by the output monitor photo diode. Once the maximum output is detected the micro controller will then control the output drive current to maintain maximum light output from the laser assembly. The output of the laser is sampled every ten seconds.

Receiver Unit

Figure 5:
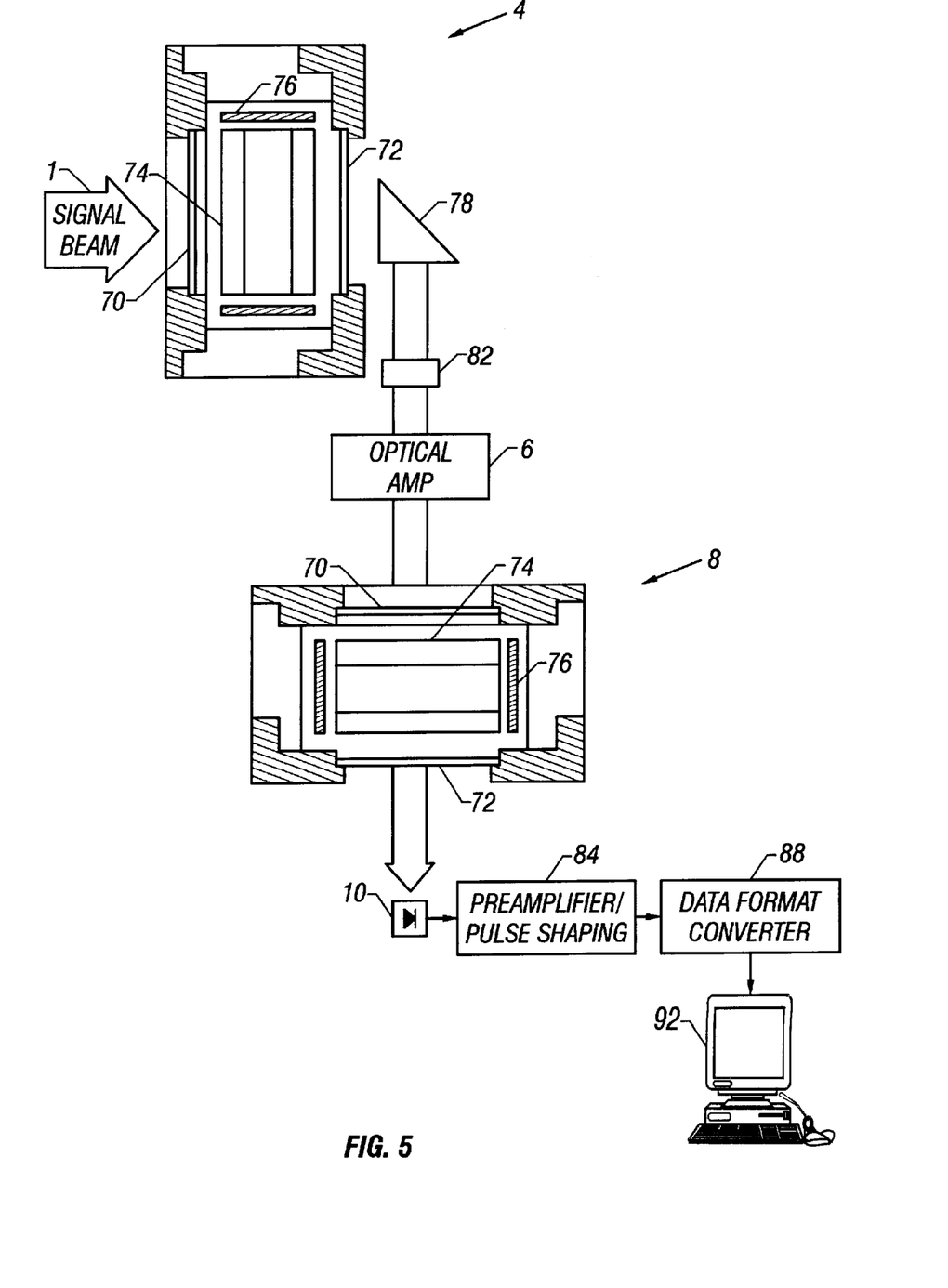
FIG. 5 is a part cross section drawing part block diagram showing the receiver module of the above preferred embodiment.

The principal element of a preferred receiver unit are shown in block and cross section form in FIG. 5.

Background Optical Filter

Signal beam 1 enters background optical filter unit 4 which could any good optical filter. In this particular embodiment the filter is a Faraday atomic line filter (preferably the same model atomic line filter as is used in the transmitter to tune the laser diode transmitter). The signal beam enters through polarizer 70 which polarizes the light in a horizontal direction. An axial magnetic field of about 150 gauss created by magnet (not shown) operating on cesium vapor heated to about 111° C. by heater 76 in vapor cell 74 causes a rotation of only that portion of the light spectrum at wavelengths at sharp Cs absorption lines near 852 nm. That light which was so rotated passes through vertical polarizer 72 and is turned by prism 78. Other light is blocked by vertical polarizer 72 and 852 nm narrow band filter (Andover #850FS40-12.5) 82. (Please note that in some applications [such as at night of if the field of view can be tightly controlled and when the optical signal is transmitted with an optical fiber] this background optical filter may not be needed.)

Optical Amplifier

The detected signal is amplified, by optical amplifier 6. The amplifier is a high power tapered stripe semiconductor amplifier that acts as a traveling wave amplifier. This amplifier with gain at the atomic line filter wavelength of 852 nm is provided by a modified off-the-shelf laser. The SDL Inc. model 8630 is an external cavity tunable laser which uses a tapered amplifier semiconductor chip as the active medium. It is easy to open the laser cavity with the insertion of a mirror to access the amplifier chip for a single pass of the signal beam. The laser cavity itself is formed by one facet of the chip (the uncoated facet serves as the output coupler), and a grating placed several centimeters away. The signal beam is directed through the uncoated facet of the amplifier, and then turned out of the cavity by the mirror. We have observed overall single pass gains of about 500 using this instrument.

Atomic Line Filter

The output of optical amplifier 6 enters atomic line filter 8. In this embodiment the atomic line filter is also a Faraday filter exactly like the one shown at 4. The filter consists of an atomic vapor in a cell located between a pair of crossed polarizers. A magnetic field is applied to the cell which Zeeman splits the energy levels resulting in different absorption lines for left and right circularly polarized light. Near these lines the filter acts as a Faraday rotator providing rotary power only in the vicinity of an absorption line, which provides the 90 degree rotation necessary to pass the second polarizer. At higher fields and vapor densities multiple rotations lead to rapid modulation sin the transmission spectrum. Away from the absorption line the filter provides an out of band rejection that is determined by the extinction ratio of the crossed polarizers.

Photo Detector.

The output of atomic line filter 8 is detected by fast photo diode 10. For a nominal 15 GHz photo receiver, high speed off-the-shelf photodiodes are available from Newport B Corporation. The D-15 detector provides a bandwidth of 29 GHz.

Fiber-Optic Embodiment

When applying the present invention as a receiver or relayer in a fiber optic system, the diminished signal from the optical fiber is fed into optical amplifier 6 as shown in FIG. 5. Optical amplifier 6 and the components shown in FIG. 5 downstream of optical amplifier 6 are applicable to demonstrate the fiber-optic embodiment of the present invention.

15 GHz Transmission Rate

Both embodiments discussed above are designed for a Data transmission rate of about 15 GHz. We use a cesium Faraday filter designed to provide a 15 GHz pass band at 852 nm to remove the broad band amplified spontaneous emissions from the signal beam.

Faraday and Voigt Filters

Figure 7:
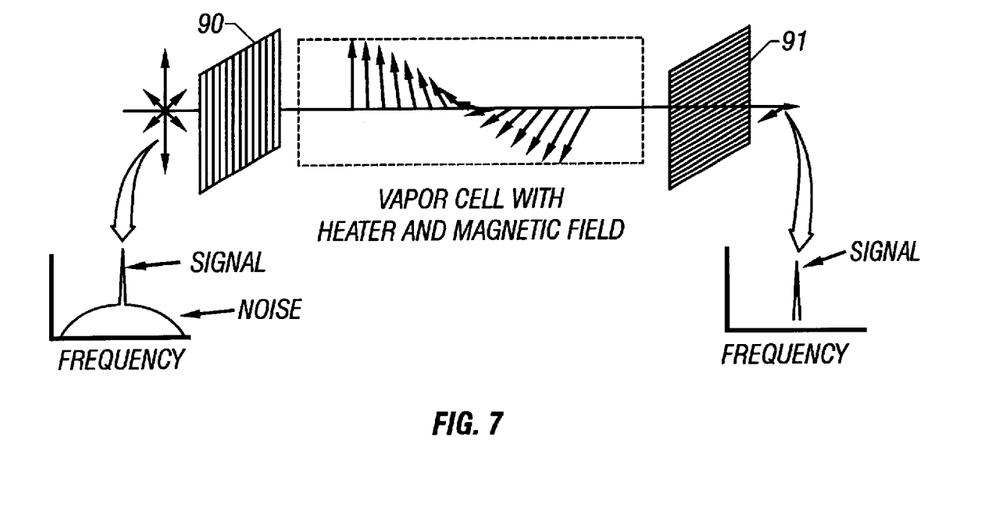
FIG. 7 is a drawing explaining the principal of the Faraday filter.

Operational principles of our Faraday filter can be understood by reference to FIG. 7. Crossed polarizers 90 and 91 serve to block out background light with a rejection ratio better than $10^{-5}$. We use high transmission polarizers which have a transmission of higher than 95%. Because these polarizers only work over a limited wavelength region in the infrared, a broad band interference filter is used in conjunction with the Faraday filter. Between the polarizers an atomic vapor (in this case cesium having a strong resonance near the wavelength of the beacon beam) in a magnetic field axially aligned with the path of the beam rotates the polarization of the beacon laser signal by 90°, while leaving other wavelengths unrotated, and thus blocked by the polarizers. The path of the transmitted light is unaffected, so spatial information is maintained.

Figure 8A:
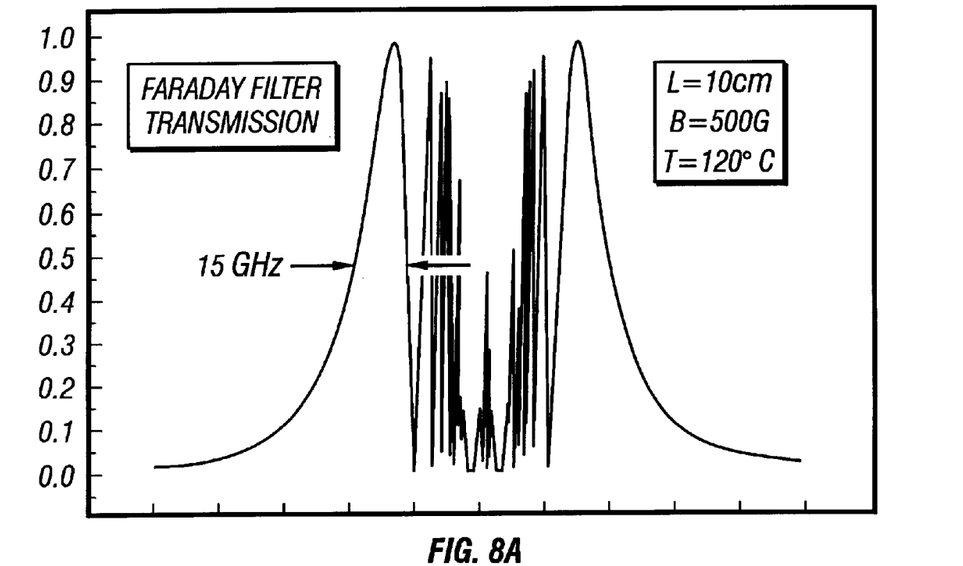
FIGS. 8A, and 8B shows a transmission spectrum of a Faraday filter compared to the absorption's spectrum of cesium.
Figure 8B:
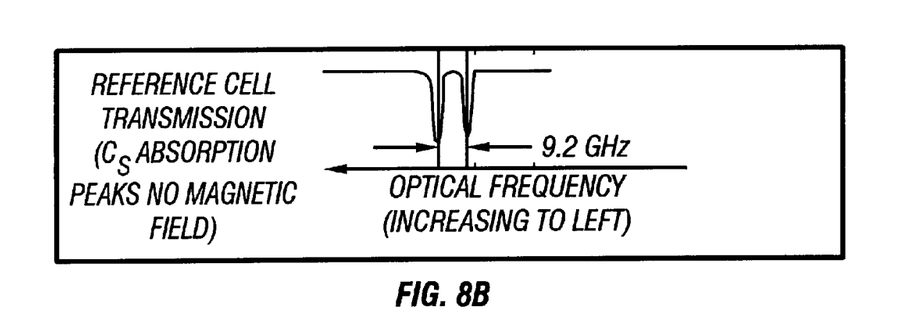

Polarization rotation is due to the separation in optical absorption frequencies for right and left circularly polarized light in the magnetic field due to the Zeeman effect. The index of refraction of the vapor near an absorption is different from 1, and the absorption separation causes the index to be different for right and left circular polarization at a given frequency, and thus those polarizations travel through the vapor with a different phase velocity. The effect of this is to cause a frequency dependent rotation in the polarization of the incoming linearly polarized light which only occurs near the atomic absorption peak. Transmission through the filter is maximum where the polarization rotation is 90°, 270°, etc., provided that the frequency of the beam is far enough away from the atomic resonance not to be absorbed. The Voigt filter is similar to the Faraday filter. In the Voigt filter, a magnetic field is arranged so that the field lines are perpendicular to the beam direction. The vapor acts like a half wave plate rather than a Faraday rotation to achieve 90° polarization rotation. Transmission spectra in the range of 852 nm for cesium for the Faraday filter is shown in FIG. 8A.

Alternate Method of Wavelength Control

Figure 6A:
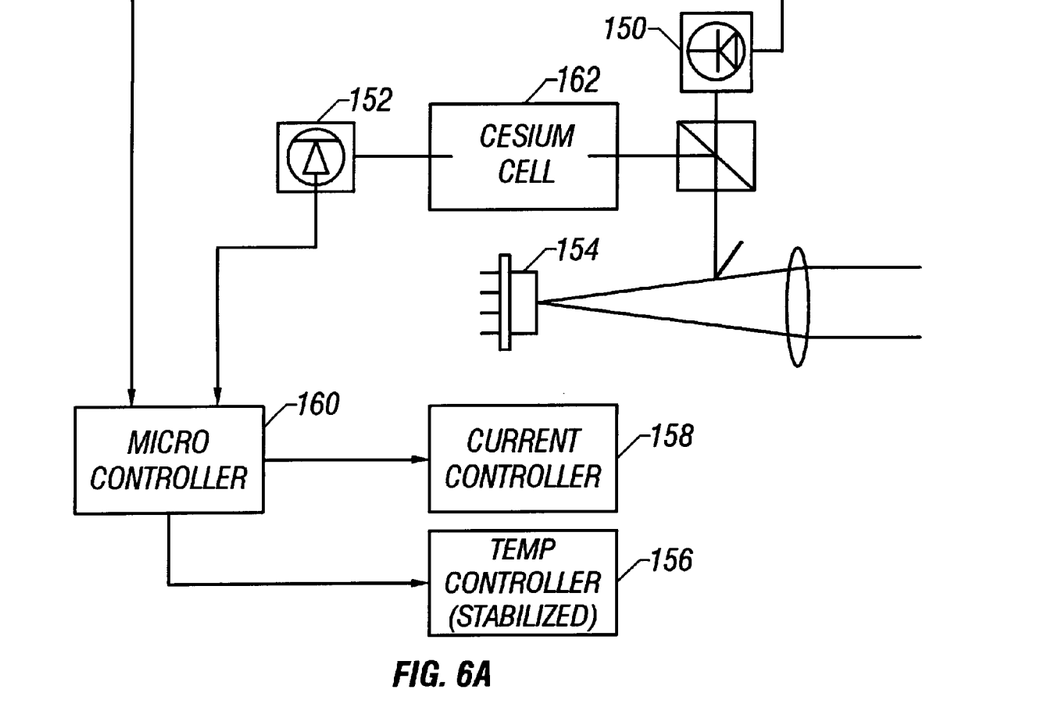
FIGS. 6A and 6B are drawings describing an alternative method of controlling transmission wavelengths.
Figure 6B:
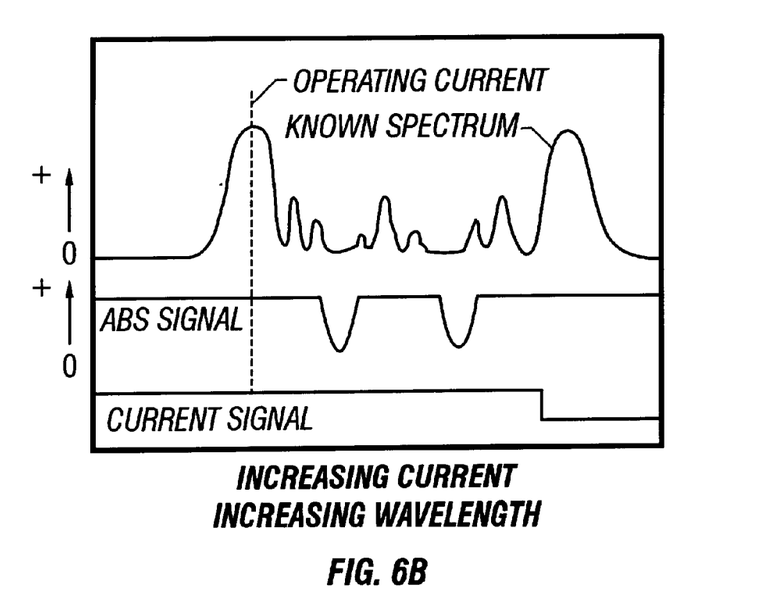

FIGS. 6A and 6B describe an alternate preferred method of controlling the transmission wavelength of the transmitter to match the known pass band of the receiving unit's Faraday atomic line filter. A sketch showing the passband is shown in FIG. 6B. In this setup an SDL 5712-H1 distributed Bragg reflector laser diode 154 is controlled with temperature controller 156 and current controller 158. Temperature controller 156 controls the temperature of the laser at a constant (within 0.050 degrees C.) temperature in the range of about 25 degrees C. Feedback control is achieved with current controller 158. Microcontroller 160 keeps the current at a value, as indicated by the vertical dashed line in FIG. 6B to match a known transmission peak in the receive unit's atomic line filter. A portion of the laser beam is sampled and run through cesium absorption cell 162 and detected by photo diode 152. As shown in FIG. 6B a current matching the second ALF transmission peak is about ⅘ the distance between the cesium cell two absorption peaks of the cesium cell as detected during periodic (once per 10 seconds) calibration scans of photo diode 152. The scans take about 10 ms.

While the above description contains many specifics, the reader should not construe these as limitations on the scope of the invention, but merely as exemplification's of preferred embodiments thereof. Those skilled in the art will envision many other possible variations are within its scope.

One such variation is the application to satellite laser communications, where an optical Doppler shift is present. In that case, the laser frequency may be locked to a frequency which is offset by the Doppler shift from the passband peak, such that the signal received matches the receiver filter passband. Accordingly the reader is requested to determine the scope of the invention by the appended claims and their legal equivalents, and not by the examples which have been given.

What is claimed is:
1. A high speed optical receiver for receiving a substantially diminished optical signal comprising:
   an optical amplifier for amplifying said diminished optical signal at least several db,
   an ultra narrow-band filter for filtering noise generated in said optical amplifier to produce a filtered amplified optical signal, said ultra narrow-band filter being an atomic line filter, and
   a fast response photo detector for detecting said filtered amplified optical signal.
2. An optical receiver as in claim 1 wherein said optical amplifier is a semiconductor optical amplifier.
3. An optical receiver as in claim 2 wherein said semiconductor amplifier is a tapered stripe semiconductor amplifier.
4. An optical receiver as in claim 1 wherein said atomic line filter is a Faraday filter.
5. An optical receiver as in claim 1 and further comprising a background filter positioned ahead of said optical amplifier for filtering background light.
6. An optical receiver as in claim 4 and further comprising a background filter positioned ahead of said optical amplifier for filtering background light wherein said background filter is a Faraday filter.
7. An optical receiver as in claim 1 wherein said fast photo detector is a photodiode.
8. An optical receiver as in claim 7 wherein said fast photo detector is a p-i-n photo diode.
9. A high speed optical receiver for receiving a substantially diminished optical signal comprising:
   a semiconductor optical amplifier for amplifying said diminished optical signal at least several db,
   a Faraday filter for filtering noise generated in said optical amplifier to produce a filtered amplified optical signal and
   a fast response photo diode for detecting said filtered amplified optical signal.
10. An optical communication system comprising:
    A) a high speed optical receiver for receiving a substantially diminished optical signal comprising:
       1) a semiconductor optical amplifier for amplifying said diminished optical signal at least several db,
       2) a Faraday filter defining a passband for filtering noise generated in said optical amplifier to produce a filtered amplified optical signal and
       3) a fast response photo diode for detecting said filtered amplified optical signal; and
    B) a high speed optical transmitter for transmitting optical signals on a light beam to said receiver comprising:
       1) a light source for producing light beam at a wavelength matched to the passband of said Faraday filter,
       2) an optical modulator for modulating said light beam to impose said optical signals on said beam.
11. An optical communication system as in claim 10 wherein said system is a free space system and said receiver further comprises a background optical filter for filtering said light beam.
12. An optical communication system as in claim 11 wherein said background optical filter is a Faraday filter.
13. An optical communication system as in claim 10 wherein said light source is a diode laser.

* * * * *